(12) United States Patent
Suzuki (10) Patent No.: US 12,027,928 B2
(45) Date of Patent: Jul. 2, 2024

(54) INSULATOR AND MOTOR

(71) Applicant: FUJITSU GENERAL LIMITED, Kanagawa (JP)

(72) Inventor: Takashi Suzuki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 43 days.

(21) Appl. No.: 17/625,228

(22) PCT Filed: Jun. 12, 2020

(86) PCT No.: PCT/JP2020/023129
§ 371 (c)(1),
(2) Date: Jan. 6, 2022

(87) PCT Pub. No.: WO2021/039026
PCT Pub. Date: Mar. 4, 2021

(65) Prior Publication Data
US 2022/0271634 A1    Aug. 25, 2022

(30) Foreign Application Priority Data

Aug. 26, 2019   (JP) ................. 2019-153698

(51) Int. Cl.
*H02K 15/12*    (2006.01)
*H02K 3/34*    (2006.01)

(52) U.S. Cl.
CPC ............... *H02K 15/12* (2013.01); *H02K 3/34* (2013.01); *Y10T 29/53152* (2015.01)

(58) Field of Classification Search
CPC ............ H02K 15/12; H02K 3/34; H02K 1/18; H02K 29/00; Y10T 29/53152; Y10T 29/53143

(Continued)

(56) References Cited

U.S. PATENT DOCUMENTS

2013/0169085 A1    7/2013  Taema
2015/0229192 A1    8/2015  Yoshida et al.
(Continued)

FOREIGN PATENT DOCUMENTS

CN    103187808 A    7/2013
CN    104578508 A    4/2015
(Continued)

OTHER PUBLICATIONS

May 30, 2022, Indian Examination Report issued for related IN Application No. 202147060680.

(Continued)

*Primary Examiner* — Thiem D Phan
(74) *Attorney, Agent, or Firm* — Paratus Law Group, PLLC (57) ABSTRACT

Insulators are formed of a resin material using injection molding and provided at an end portion in an axial direction of a cylindrical stator included in a motor. Each of the insulators includes a wall portion that is formed in a cylindrical shape; a plurality of winding drum portions that consecutively extend from the wall portion so as to be along one end surface in an axial direction of the wall portion from an inner peripheral surface of the wall portion toward an inner side in a radial direction of the wall portion; and a plurality of opening portions that are formed between the respective winding drum portions, which are adjacent in the circumferential direction of the wall portion. A gate mark, which indicates an injection location of the resin material, is formed on the one end surface in the axial direction of the wall portion.

7 Claims, 9 Drawing Sheets

(58) Field of Classification Search
USPC ....... 29/734, 596, 597, 602.1, 732, 733, 887
See application file for complete search history.

(56) References Cited

U.S. PATENT DOCUMENTS

| | | |
|---|---|---|
| 2017/0093252 A1 | 3/2017 | Otsubo |
| 2019/0097506 A1 | 3/2019 | Hashimoto et al. |

FOREIGN PATENT DOCUMENTS

| | | | |
|---|---|---|---|
| CN | 104836395 A | | 8/2015 |
| CN | 106555766 A | | 4/2017 |
| CN | 206977166 U | | 2/2018 |
| CN | 107852058 A | | 3/2018 |
| JP | 2008-141821 A | | 6/2008 |
| JP | 2010-263675 A | | 11/2010 |
| JP | 2011-139549 A | | 7/2011 |
| JP | 2011139549 A | * | 7/2011 |
| JP | 2018-139463 A | | 9/2018 |

OTHER PUBLICATIONS

Jan. 21, 2024, Chinese Office Action issued for related CN Application No. 202080046124.7.

* cited by examiner

INSULATOR AND MOTOR

CROSS REFERENCE TO PRIOR APPLICATION

This application is a National Stage Patent Application of PCT International Patent Application No. PCT/JP2020/023129 (filed on Jun. 12, 2020) under 35 U.S.C. § 371, which claims priority to Japanese Patent Application No. 2019-153698 (filed on Aug. 26, 2019), which are all hereby incorporated by reference in their entirety.

FIELD

The present invention relates to an insulator and a motor.

BACKGROUND

A motor that includes a rotor, a stator disposed on an outer peripheral side of the rotor, and an insulator provided at an end portion in an axial direction of the stator, is known as the motor of a compressor. This type of insulator is formed of a resin material using injection molding, and includes a wall portion formed in a cylindrical shape, a plurality of winding drum portions extending from an inner peripheral surface of the wall portion toward an inner side in a radial direction of the wall portion, and a plurality of opening portions formed between the respective winding drum portions in a circumferential direction of the wall portion.

Some metal molds used for insulators have injection openings (hereinafter, referred to as gates) through which resin materials are injected, are disposed at positions corresponding to winding drum portions. Accordingly, in the insulator, in association with the gates arranged in the metal mold, injection marks (hereinafter, referred to as gate marks) indicating injection locations of the resin materials, are generated on a bottom surface of each of the winding drum portions that are in contact with a stator.

CITATION LIST

Patent Literature

Patent Literature 1: Japanese Laid-open Patent Publication No. 2008-141821

SUMMARY

Technical Problem

With the insulator described above, at the time of injection molding, a weld corresponding to a portion, in which the mechanical strength is low, is generated at a portion, in which flows of the resin materials injected from two gates that are adjacent in a circumferential direction of the insulator in the metal mold meet. If the resin materials are injected from the bottom surface of the winding drum portion into the metal mold, a meeting section mark (weld line) of the resin materials is generated on the wall portion.

In particular, in the insulator described above, the resin materials that are in a molten state and that are injected from the gate at the time of injection molding, are gradually cooled from a high temperature state by the metal mold that has a temperature higher than the temperatures of the molten resin materials and that has high thermal conductivity before the molten resin materials reach the position of the weld. Accordingly, the meeting section mark (weld line) sharply appear as a result of the resin materials that are cooled and getting solidify meeting each other, and thus, the mechanical strength of the wall portion tends to be decreased.

Accordingly, the disclosed technology has been conceived in light of the circumstances described above, and an object thereof is to provide an insulator and a motor capable of suppressing a reduction in mechanical strength caused by a weld generated on a wall portion.

Solution to Problem

According to an aspect of an embodiments in the present application, an insulator that is formed of a resin material using injection molding, and that is provided at an end portion in an axial direction of a stator that is included in a motor and that is formed in a cylindrical shape, the insulator includes: a wall portion that is formed in a cylindrical shape; a plurality of winding drum portions that consecutively extend from the wall portion so as to be along one end surface in an axial direction of the wall portion from an inner peripheral surface of the wall portion toward an inner side in a radial direction of the wall portion; and a plurality of opening portions that are formed between the respective winding drum portions, which are adjacent in a circumferential direction of the wall portion, wherein a gate mark, which indicates an injection location of the resin material, is formed on the one end surface in the axial direction of the wall portion.

Advantageous Effects of Invention

According to an aspect of an embodiment of the insulator disclosed in the present application, it is possible to suppress a reduction in mechanical strength caused by a weld that is generated on a wall portion.

DESCRIPTION OF EMBODIMENTS

Preferred embodiments of an insulator and a motor disclosed in the present application, will be described in detail below with reference to the accompanying drawings. Furthermore, the insulator and the motor disclosed in the present application, is not limited to the embodiments described below.

First Embodiment

Figure 1:
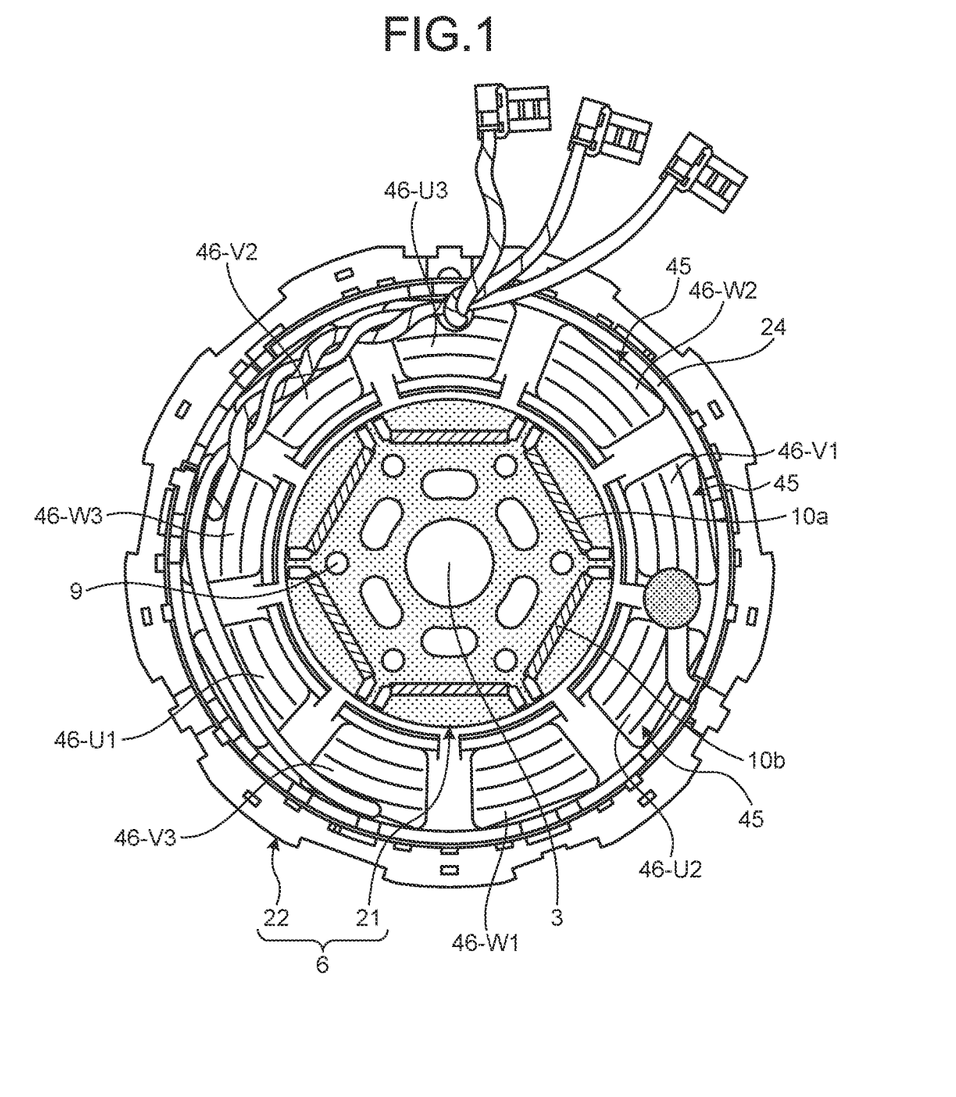
FIG. 1 is a plan view illustrating a three-phase motor according to a first embodiment viewed from an upper insulator side.

FIG. 1 is a plan view illustrating a three-phase motor 6 according to a first embodiment viewed from an upper insulator side. As illustrated in FIG. 1, the three-phase motor 6 includes a rotor 21, and a stator 22 that is arranged on an outer peripheral side of the rotor 21. The rotor 21 is formed in a cylindrical shape by laminating a plurality of thin plates (magnetic body) made of silicon steel, and integrating them using by a plurality of rivets 9. A shaft 3 is inserted into the center of the rotor 21, and the rotor 21 is fixed to the shaft 3. In the rotor 21, six slit-shaped magnet embedding holes 10a are formed to constitute the six sides of a hexagon around the shaft 3. The magnet embedding holes 10a are formed at predetermined intervals in the circumferential direction of the rotor 21. Plate-shaped permanent magnets 10b are embedded in the respective magnet embedding holes 10a.

The stator 22 is formed in a substantially cylindrical shape, and is disposed to surround the rotor 21, and is fixed to the interior of a container that is not illustrated. The stator 22 includes a stator core 23, an upper insulator 24, a lower insulator 25, and a plurality of winding wires 46. The upper insulator 24 is fixed to the upper end portion of the stator core 23. The lower insulator 25 is fixed to the lower end portion of the stator core 23. The upper insulator 24 and the lower insulator 25 are insulating portions that insulate the stator core 23 and the winding wires 46.

Figure 2:
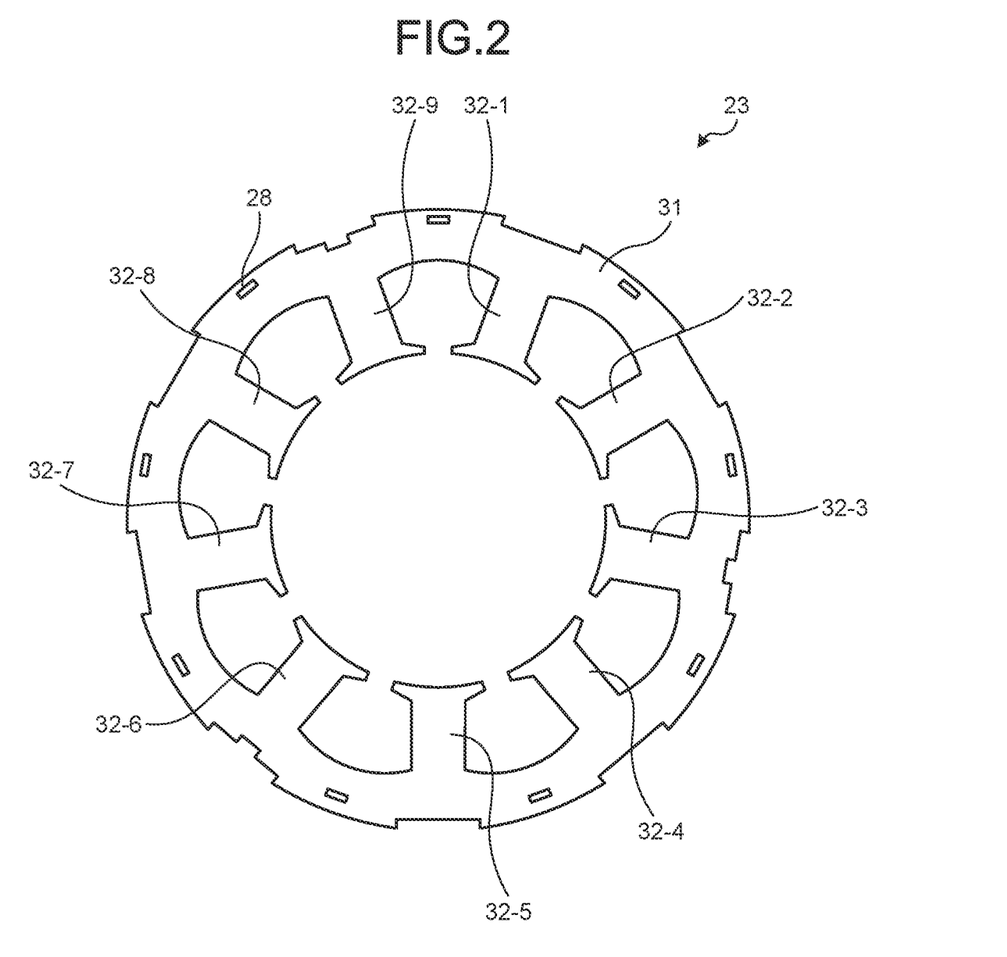
FIG. 2 is a plan view illustrating a stator core according to the first embodiment.

FIG. 2 is a bottom view of the stator core 23 according to the first embodiment. The stator core 23 is formed by, for example, laminating a plurality of metal plates made of a soft magnetic material represented by silicon steel plates, and includes, as illustrated in FIG. 2, a yoke portion 31, and a plurality of stator core tooth portions 32-1 to 32-9. The yoke portion 31 is formed in a substantially cylindrical shape. Of the plurality of stator core tooth portions 32-1 to 32-9, the first stator core tooth portions 32-1 is formed in a substantially cylindrical shape. The first stator core tooth portions 32-1 is formed with one end thereof being consecutively along the inner peripheral surface of the yoke portion 31, i.e., is formed so as to protrude from the inner peripheral surface of the yoke portion 31 toward the central axis of the stator core 23. Similarly to the first stator core tooth portions 32-1, of the plurality of stator core tooth portions 32-1 to 32-9, the stator core tooth portions 32-2 to 32-9 other than the first stator core tooth portions 32-1, are also formed in a substantially cylindrical shape, and protrude from the inner peripheral surface of the yoke portion 31 toward the central axis of the stator core 23. Furthermore, the plurality of stator core tooth portions 32-1 to 32-9 are formed by being disposed at regular intervals of 40 degrees on the inner peripheral surface of the yoke portion 31. On the yoke portion 31 included in the stator core 23, a plurality of caulking joining portions 28 that join the plurality of laminated metal plates by using caulking are provided. Each of the caulking joining portions 28 is provided at a position between the associated stator core tooth portions 32-1 to 32-9 that are adjacent with each other in the circumferential direction of the stator core 23.

Figure 3:
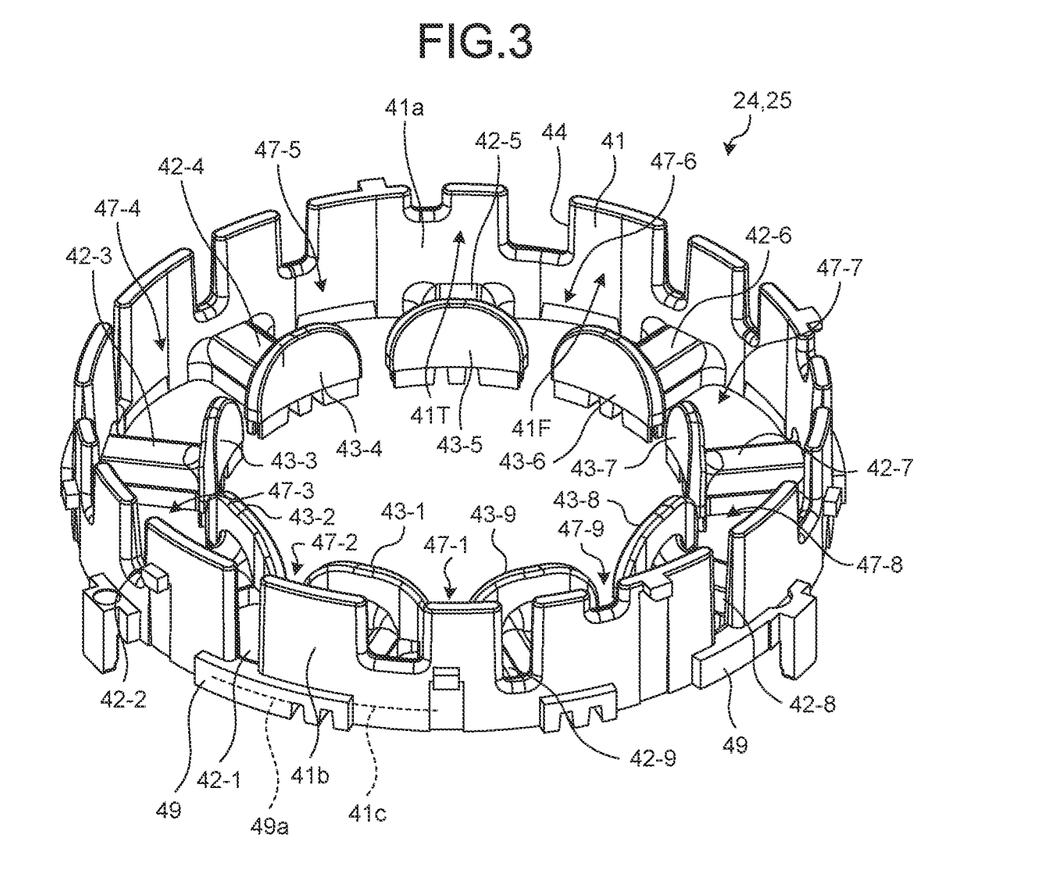
FIG. 3 is a perspective view illustrating an upper insulator according to the first embodiment.

FIG. 3 is a perspective view illustrating the upper insulator 24 according to the first embodiment. The upper insulator 24 is formed in a cylindrical shape by an insulating material exemplified by polybutylene terephthalate resin (PBT), and includes, as illustrated in FIG. 3, a wall portion 41 that is formed in a cylindrical shape, a plurality of insulator tooth portions 42-1 to 42-9 as winding drum portions, a plurality of flange portions 43-1 to 43-9, and opening portions 47-1 to 47-9 that are formed between the respective insulator tooth portions 42-1 to 42-9, which are adjacent in the circumferential direction of the upper insulator 24. The wall portion 41 is formed in a substantially cylindrical shape. On the wall portion 41, a plurality of slits 44 are formed. Furthermore, the wall portion 41 includes an abutting surface 41c that is formed in a ring shape and that is in contact with the stator 22 on one end surface in the axial direction of the wall portion 41.

The first insulator tooth portion 42-1 out of the plurality of insulator tooth portions 42-1 to 42-9 is formed in a right prism shape having a substantially semicircular in cross section. One end of the first insulator tooth portion 42-1 is coupled to the inner peripheral surface of the wall portion 41, i.e., is formed so as to extend, in a rod shaped manner, from the inner peripheral surface 41a of the wall portion 41 toward the inner side in the radial direction of the wall portion 41. Furthermore, the first insulator tooth portion 42-1 is formed so as to consecutively extend from the wall portion 41 so as to be along one end surface in the axial direction of the wall portion 41 (i.e., the abutting surface 41c that is formed in a ring shape, and that is in contact with the stator 22). The axial direction of the wall portion 41 mentioned here, indicates the axial direction of the shaft 3 of the three-phase motor 6.

Of the plurality of insulator tooth portions 42-1 to 42-9, the insulator tooth portions 42-2 to 42-9 other than the first insulator tooth portion 42-1 also formed in a right prism shape, and, similarly to the first insulator tooth portion 42-1, is formed so as to extend, in a rod shaped manner, from the inner peripheral surface of the wall portion 41 toward the inner side in the radial direction of the wall portion 41. Furthermore, the first insulator tooth portions 42-2 to 42-9 are also formed on the abutting surface 41c, which is formed in a ring shape as one end surface of the wall portion 41 in the axial direction. The plurality of insulator tooth portions 42-1 to 42-9 are formed by being disposed at regular intervals of 40 degrees on the inner peripheral surface of the wall portion 41.

Furthermore, the wall portion 41 of the upper insulator 24 includes, as will be described later, a plurality of supporting protrusion 49 that support the winding wires 46 that are pulled out from winding portions 45, in which the winding wires 46 are wound around the respective insulator tooth portions 42-1 to 42-9, to the outer peripheral surface 41b side of the wall portion 41. The plurality of supporting protrusion 49 are disposed at intervals in the circumferential direction of the wall portion 41, and support such that the winding wires 46, which are wound along the circumferential direction of the outer peripheral surface 41b of the wall portion 41, does not move to the stator 22 side.

The supporting protrusion 49 protrudes from the position facing the respective insulator tooth portions 42-1 to 42-9 on the outer peripheral surface 41b of the wall portion 41 toward an outer side in the radial direction of the wall portion 41, and includes an end surface 49a that extends along the abutting surface 41c of the wall portion 41. The abutting surface 41c of the wall portion 41 includes an end surface 49a of the supporting protrusion 49.

The plurality of flange portions 43-1 to 43-9 are associated with the plurality of respective insulator tooth portions 42-1 to 42-9, and are formed in a substantially semicircular plate shape. Of the plurality of flange portions 43-1 to 43-9, the first flange portion 43-1 associated with the first insulator tooth portion 42-1, is consecutively formed on the other end of the first insulator tooth portion 42-1. Of the plurality of flange portions 43-1 to 43-9, similarly to the first flange portion 43-1, the flange portions 43-2 to 43-9 other than the first flange portion 43-1 are also consecutively formed on the other ends of the plurality of respective insulator tooth portions 42-2 to 42-9.

The lower insulator 25 is formed in the same manner as the upper insulator 24. In other words, the lower insulator 25 is formed in a cylindrical shape by the insulating material, and includes the wall portion 41, the plurality of insulator tooth portions 42-1 to 42-9, and the plurality of flange portions 43-1 to 43-9. Hereinafter, the plurality of insulator tooth portions 42-1 to 42-9 of the upper insulator 24 and the lower insulator 25, are collectively referred to as the insulator tooth portions 42. Furthermore, the plurality of flange portions 43-1 to 43-9 of the upper insulator 24 and the lower insulator 25, are referred to as the flange portion 43.

Figure 4:
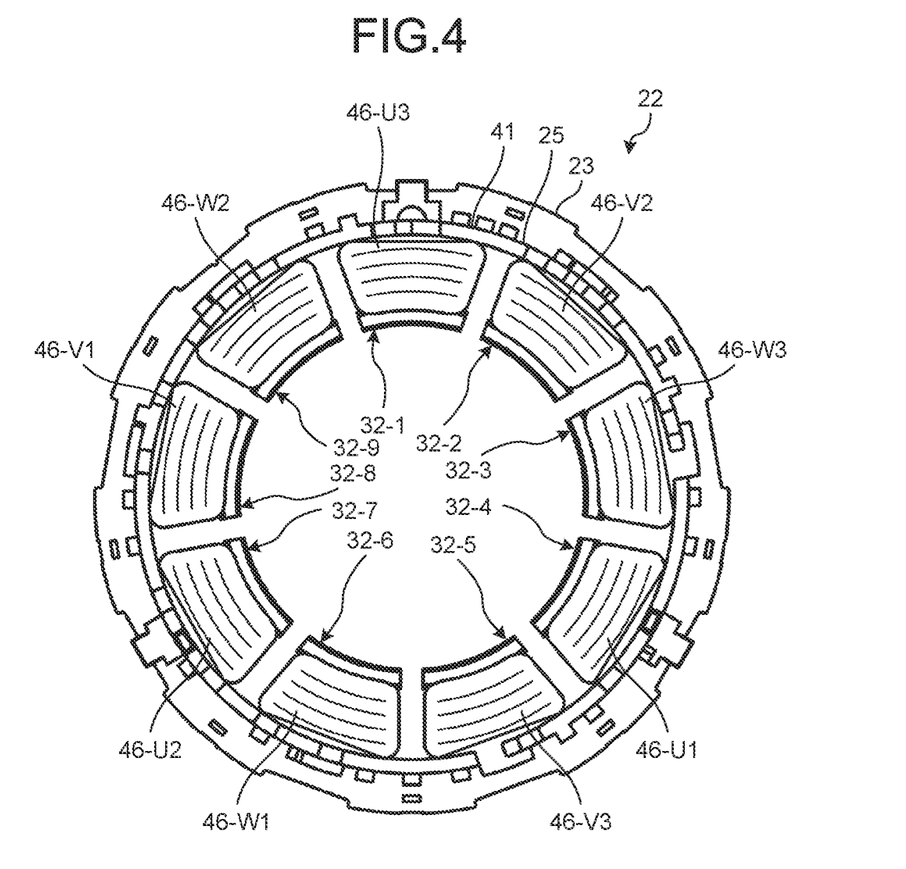
FIG. 4 is a plan view illustrating a stator, in which a lower insulator according to the first embodiment is assembled.

FIG. 4 is a plan view illustrating the stator 22, in which the lower insulator 25 according to the first embodiment is assembled. As illustrated in FIG. 4, the winding wires 46 that are electric wires, are wound around the plurality of stator core tooth portions 32-1 to 32-9 of the stator core 23. The winding portion 45 is wound around each of the stator core tooth portions 32-1 to 32-9 by the respective winding wires 46. The three-phase motor 6 according to the embodiment is a concentrated-winding type motor having six poles and nine slots (see FIG. 1). The plurality of winding wires 46 includes three U-phase winding wires 46-U1 to 46-U3, three V-phase winding wires 46-V1 to 46-V3, and three W-phase winding wires 46-W1 to 46-W3. Furthermore, in the stator 22, a neutral line pulled out and bundled from each of the winding portions 45, is covered by an insulating tube, and is inserted in the gap that is formed between the corresponding winding portions 45, which are adjacent in the circumferential direction of the stator 22 (i.e., in the direction of rotation of the rotor 21) (see FIG. 1). In the following description, the plurality of stator core tooth portions 32-1 to 32-9 of the stator core 23, are correctively referred to as the stator core tooth portions 32.

(Characteristic Configuration of Three-Phase Motor)

In the following, the characteristics of the upper insulator 24 and the lower insulator 25 included in the three-phase motor 6 according to the first embodiment, will be described. The upper insulator 24 and the lower insulator 25 are formed by performing injection molding on a resin material using a metal mold. The characteristics of the embodiment is that a gate mark P, which indicates an injection location of the resin material, generated at the time of injection molding of each of the upper insulator 24 and the lower insulator 25, is disposed on the abutting surface 41c of the wall portion 41. In the following, the main part of the upper insulator 24 will be described; however, the same applies to the lower insulator 25.

The upper insulator 24 is formed of a resin material, such as polybutylene terephthalate (PBT), polyphenylene sulfide (PPS), liquid crystal polymer (LCP). Furthermore, an example of the resin material of the upper insulator 24 includes a material to which another material, such as glass fibers, may be added.

Figure 5A:
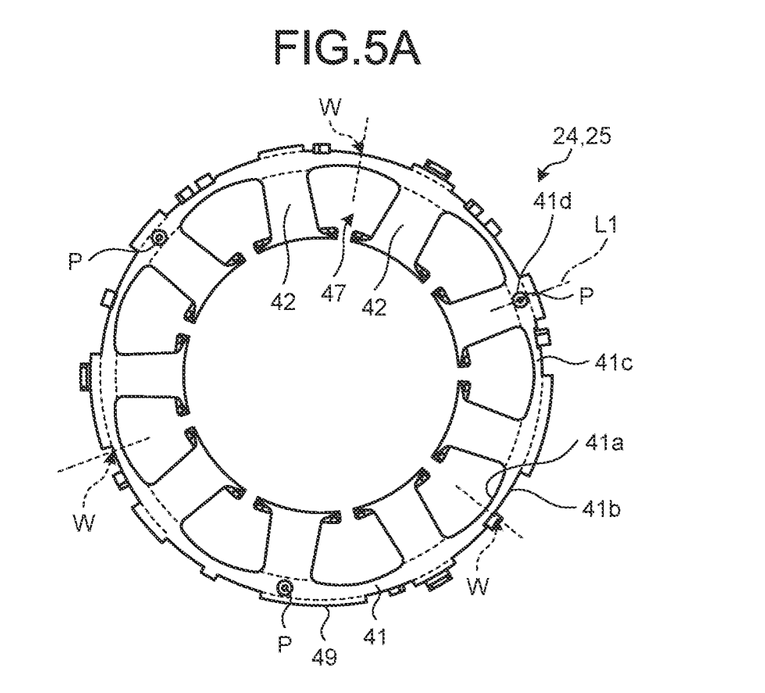
FIG. 5A is a plan view illustrating a main part of the upper insulator according to the first embodiment.
Figure 5B:
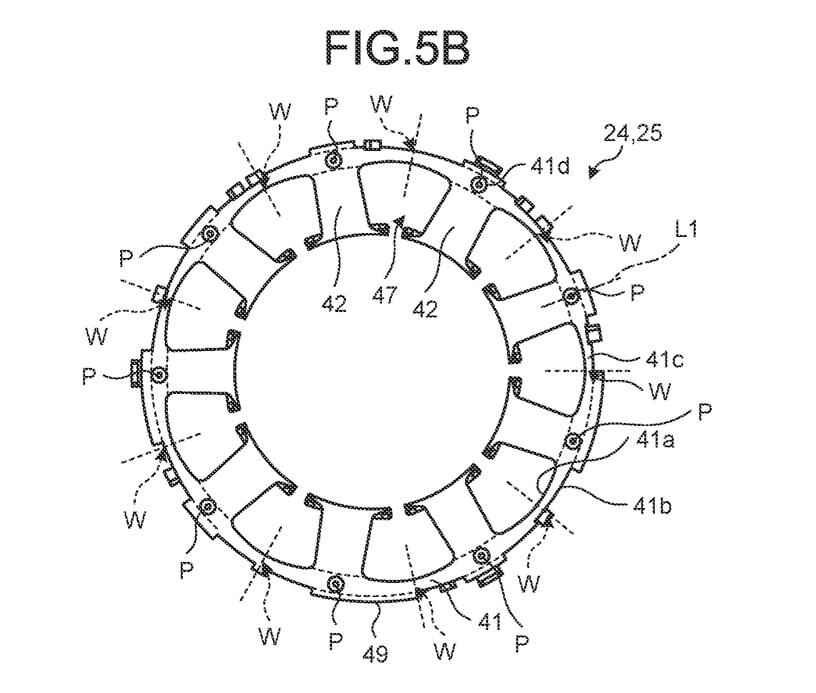
FIG. 5B is a plan view illustrating a modification of the main part of the upper insulator according to the first embodiment.

FIG. 5A is a plan view illustrating the main part of the upper insulator 24 according to the first embodiment. FIG. 5B is a plan view illustrating a modification of the main part of the upper insulator 24 according to the first embodiment. FIG. 5A and FIG. 5B are plan views each illustrating the upper insulator 24, viewed from the side that is in contact with the stator 22.

As illustrated in FIG. 5A, on the abutting surface 41c of the wall portion 41 of the upper insulator 24 according to the first embodiment, the gate marks P of the resin materials, generated at the time of injection molding of the upper insulator 24, are formed. The plurality of gate marks P according to the first embodiment are formed, in the circumferential direction of the wall portion 41, on the outer side in the radial direction of the plurality of insulator tooth portions 42. On the abutting surface 41c of the wall portion 41, the gate marks P, the number of which (i.e., three gate marks) is a divisor of the number of the plurality of insulator tooth portions 42 (i.e., nine insulator tooth portions), are provided, and the plurality of gate marks P are disposed at regular intervals in the circumferential direction of the wall portion 41. Accordingly, the flow of the resin materials in the circumferential direction of the wall portion 41 at the injection molding, are equally ensured on both sides of the circumferential direction. Furthermore, each of the gate marks P is formed in, for example, a circular shape, and is associated with an opening shape of the gate that is included in the metal mold (not illustrated).

On the wall portion 41 of the upper insulator 24 in which the gate marks P are formed in this way, welds W are generated in the vicinity of the center in the circumferential direction of the wall portion 41 between the gate marks P that are adjacent with each other in the circumferential direction of the wall portion 41. The welds W according to the first embodiment are formed in the vicinity of the center of each of opening portions 47 in the circumferential direction of the wall portion 41.

Furthermore, each of the gate marks P is disposed on a center line L1 of the respective insulator tooth portions 42 in the circumferential direction of the wall portion 41. Accordingly, the resin materials flowing toward the insulator tooth portions 42, the wall portion 41, and the like at the time of injection molding, equally flow toward both sides in the circumferential direction of the wall portion 41.

Furthermore, as illustrated in FIG. 5B, on the upper insulator 24 according to the first embodiment, the same number of the gate marks P (i.e., nine gate marks) as the number of plurality of insulator tooth portions 42, may be disposed at regular intervals in the circumferential direction of the wall portion 41. In other words, each of the gate marks P is formed at the position corresponding to the outer side in the radial direction of all of the insulator tooth portions 42 in the circumferential direction of the wall portion 41 so as to be associated with the number of slots of the three-phase motor 6. With the upper insulator 24 configured in this way, it is possible to further reduce the time taken for the resin materials to reach the respective welds W from the respective gates of the metal mold at the time of injection molding, and it is thus possible to suppress a reduction in mechanical strength of the wall portion 41.

Figure 6:
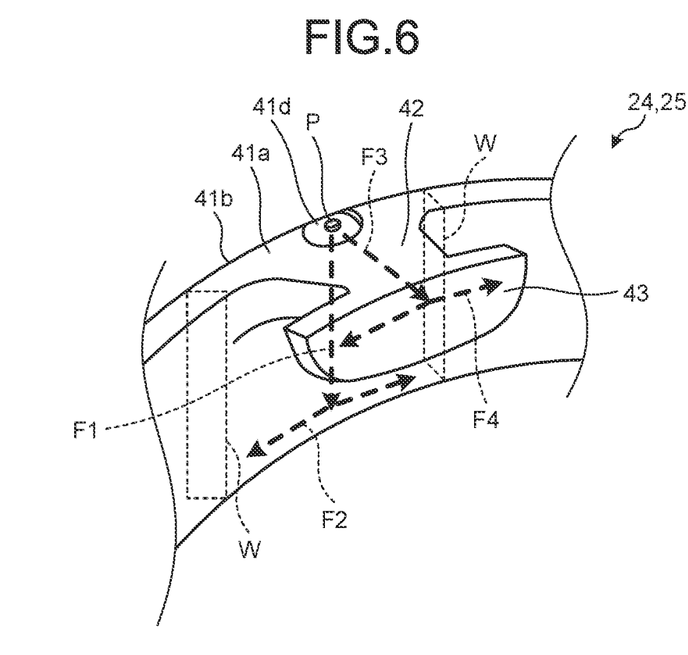
FIG. 6 is an enlarged perspective view of a main part for explaining the flows of resin materials in the upper insulator according to the first embodiment.

Furthermore, as illustrated in FIG. 5A, FIG. 5B, FIG. 6, and the like, a recess portion 41d, having a circular shape, is formed around each of the gate marks P so as to become hollow from the abutting surface 41c of the wall portion 41. The recess portion 41d is formed in a concentric manner centered on, for example, each of the gate marks P, and the gate marks P are disposed on the bottom surface of the respective recess portions 41d. With the recess portions 41d formed in this way, it is possible to prevent a burr or the like generated on each of the injection marks P from protruding from the abutting surface 41c; therefore, it is possible to prevent a gap between the abutting surface 41c of the upper insulator 24 and the lower insulator 25, and the stator core 23, from being generated when the upper insulator 24 and the lower insulator 25 are coupled to the stator core 23 at the time of assembly of the three-phase motor 6.

(Flows of Resin Materials at the Time of Injection Molding)

Figure 7:
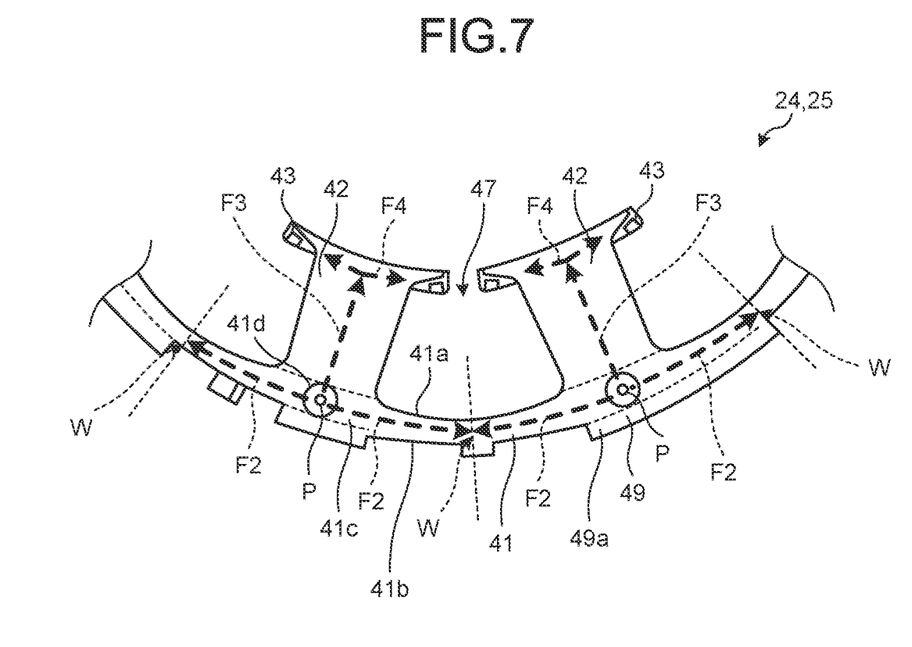
FIG. 7 is an enlarged plan view for explaining the flows of the resin materials in the upper insulator according to the first embodiment.

FIG. 6 is an enlarged perspective view of the main part illustrating the flows of the resin materials in the upper insulator 24 according to the first embodiment. FIG. 7 is an enlarged plan view of the main part illustrating the flows of the resin materials in the upper insulator 24 according to the first embodiment.

As illustrated in FIG. 6, the resin material injected from each of the gates (the position of each of the gate marks P) of the metal mold at the time of injection molding of the upper insulator 24, tends to linearly flow the direction, in which the resin material is injected, and flows from each of the gates (the position of each of the gate marks P), provided at the position of the wall portion 41, along the first direction F1 flowing toward the axial direction of the wall portion 41. The resin material flowing along the first direction F1 inside the metal mold (not illustrated), changes its flow direction by colliding against the location corresponding to the other end surface of the wall portion 41 (the surface on the side opposite to the abutting surface 41c of the wall portion 41 in the axial direction of the wall portion 41), and flows, as illustrated in FIG. 6 and FIG. 7, along second directions F2 that are toward the directions separated from each other in the circumferential direction of the wall portion 41. Then, the resin material, which is injected from each of the gates (the position of each of the gate marks P) and flows along the second directions F2, and the resin material, which is injected from the other gate (the position of the gate mark P) and flows along the second directions F2, collide with each other, so that the welds W are formed.

Namely, by injecting the resin material from one end surface side of the wall portion 41 (the abutting surface 41c side) toward the other end surface side of the wall portion 41 (in the direction in which the wall portion 41 extends from the abutting surface 41c) (in other words, the gate mark P of the resin material generated at the time of injection molding, is to be formed on the abutting surface 41c), the molten-state resin material injected from each of the gates (the position of each of the gate marks P), directly flows from each of the gates into a space, in which the wall portion 41 inside the metal mold is formed, along the first direction F1 and the second direction F2. Accordingly, the resin materials injected from the respective gates adjacent in the circumferential direction having a high temperature bump into each other in a state of high fluidity; therefore, the resin materials are mixed together, and thus, it is possible to prevent the welds W from being easily generated. Furthermore, because the resin materials are sequentially filled in the metal mold from the other end surface side of the wall portion 41, the welds W are less likely to be generated on the other end surface side of the wall portion 41, and thus, even if the welds W are generated, it is possible reduce an affected area to only a small portion on the abutting surface 41c side. Therefore, it is possible to enhance the mechanical strength of the wall portion 41 as compared to the case where the welds W are formed by the resin materials that are in a state of low temperature after elapse of a period of time since the start of injection (a comparative example illustrated in FIG. 10 described later). Furthermore, the resin materials promptly and smoothly flow in the first direction F1 and the second directions F2, so that the wall portion 41 is appropriately formed.

Subsequently, when the wall portion 41 is substantially formed by the resin material flowing from each of the gates (the position of each of the gate marks P) to the first direction F1 and the second directions F2, a flow of a third direction F3, in which the insulator tooth portion 42 is formed from each of the gates (the position of each of the gate marks P), is generated. Furthermore, the resin material flowing along the third direction F3, changes its flow direction by colliding against the location corresponding to the end portion (the inner peripheral surface of the flange portion 43) on a radially inner side of the flange portion 43, and then flows along, as illustrated in FIG. 6 and FIG. 7, fourth directions F4 flowing toward both sides in the circumferential direction of the flange portion 43. Accordingly, the resin materials promptly and smoothly flow, on the basis of the third direction F3 and the fourth directions F4, inside the metal mold from the wall portion 41 side toward the insulator tooth portion 42 sides and the flange portion 43 sides; therefore, the insulator tooth portions 42 and the flange portions 43 are appropriately formed.

Figure 10:
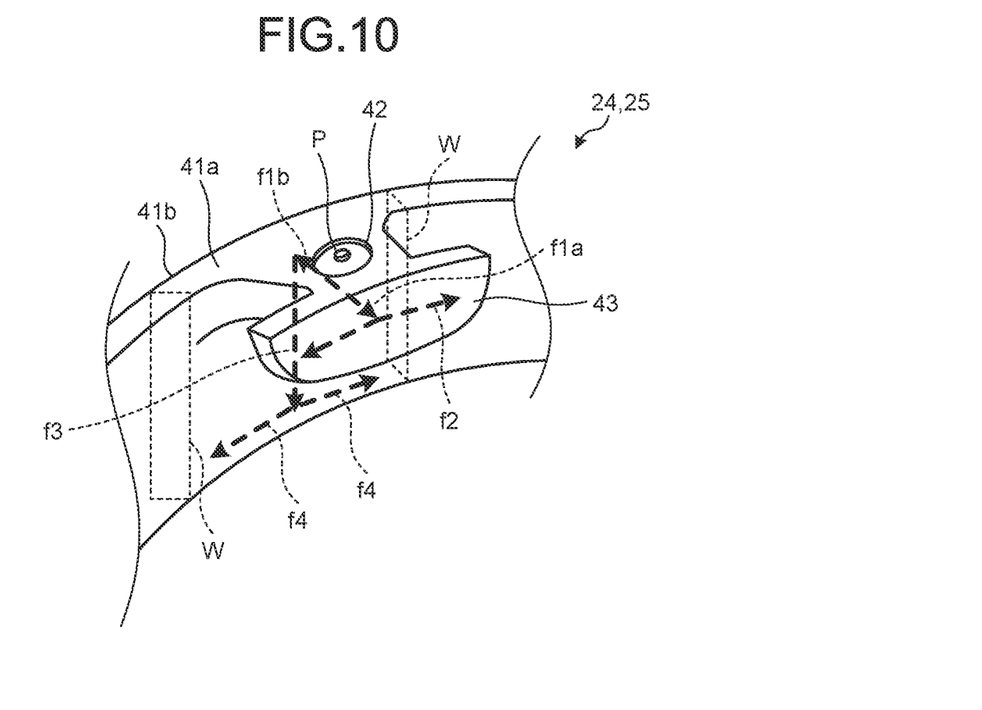
FIG. 10 is an enlarged perspective view for explaining the flows of the resin materials in the upper insulator in a comparative example.

FIG. 10 is an enlarged perspective view of the main part illustrating the flows of the resin materials in the upper insulator according to the comparative example. Here, as the comparative example, a case in which the gate mark P is formed at the insulator tooth portion 42, for example, a case in which the gate mark P is formed at the center of the bottom surface of the insulator tooth portion 42 that is in contact with the stator 22, will be described with reference to FIG. 10. In this case, the resin material injected from each of the gates (the position of the gate mark P) of the metal mold, immediately changes its flow direction, which is toward the axial direction in the insulator tooth portion 42, to a first flow f1 flowing toward in the radial direction of the insulator tooth portion 42. At this time, the flow of the resin material is separated into a first direction f1a, in which the resin material flows from the gate toward the flange portion 43 side, and a first direction f1b, in which the resin material flows from the gate toward the wall portion 41 side.

The resin material flowing along the first direction f1a from the gate (the position of the gate mark P) toward the flange portion 43 side, changes its flow direction by colliding against the location corresponding to the end portion on radially inner side of the flange portion 43, thereby flowing along the second directions f2 toward both sides of the circumferential direction of the flange portion 43. The insulator tooth portion 42 and the flange portion 43 are formed by the resin material that flows in the first direction f1a and the second directions f2.

In contrast, the resin material flowing from the gate (the position of the gate mark P) toward the wall portion 41 side along the first direction f1b, changes its flow direction by colliding against the location corresponding to the outer peripheral surface 41b of the wall portion 41, and flows along third directions f3 that are toward the axial direction of the wall portion 41. The resin material flowing along the third directions f3, further changes its direction by colliding against the location corresponding to the other end surface of the wall portion 41 (the surface on the side opposite to the abutting surface 41c of the wall portion 41 in the axial direction of the wall portion 41), and flows along fourth directions f4 that are toward the directions separated from each other in the circumferential direction of the wall portion 41. Then, the resin material, which is injected from the gate (the position of the gate mark P) and is flowing along the fourth directions f4, and the resin material, which is injected from the other gate (the position of the gate mark P) and is flowing along the fourth directions f4, meet each other, so that the weld W is formed.

As described above, if the gate marks P are formed on the insulator tooth portions 42, direction of the flow of each of the resin materials is repeatedly changed, and a flow velocity is reduced, so that it tends to take time to meet both of the flows of the injected resin materials with each other. Furthermore, the flows of the resin materials are firstly separated into the first direction f1a, in which the resin material flows from the gate (the position of the gate mark P) toward the flange portion 43 side, and the first direction f1b, in which the resin material flows from the gate toward the wall portion 41 side; therefore, a flow rate of the resin materials contributing the formation of the wall portion 41, is decreased, and it tends to further take time to complete the formation of the wall portion 41. Accordingly, in the comparative example, the temperature of both of the resin materials is decreased and solidified at the time at which both of the resin materials injected from the gates that are adjacent in the circumferential direction, so that the weld W tends to be formed, and the mechanical strength of the wall portion 41 accordingly tends to be reduced.

Furthermore, in the comparative example illustrated in FIG. 10, the resin material injected from the gate, reaches the wall portion 41 from the insulator tooth portion 42, and then, flows toward the direction separated from each other in the circumferential direction of the wall portion 41; therefore, as compared to the first embodiment illustrated in FIG. 6, the distance from the gate mark P to the weld W generated at the wall portion 41, is increased. As described above, the temperature of the metal mold at the time of injection molding, is lower than the temperature of the resin material that is in the molten state at the time of injection. Thus, the resin material that is in the molten state, is easily cooled by the metal mold having high thermal conductivity, and the resin material starts to be solidified before the flows of the resin materials meet (form the weld W), so that the mechanical strength in the vicinity of the weld W generated at the wall portion 41, tends to be further reduced.

In contrast, in the embodiment, as compared to the comparative example described above, it is possible to shorten the distance from the gate (the position of the gate mark P) to the weld W generated at the wall portion 41; therefore, the time needed for the resin material to reach the weld W generated at the wall portion 41, is reduced, and also, the period of time for which the resin material is in contact with the metal mold having the temperature lower than that of the resin material, is reduced. Accordingly, the resin material injected from each of the gates of the metal mold promptly and smoothly flows toward the weld W that corresponds to the position, in which the resin materials injected from the respective gates meet with each other. Consequently, it is possible to suppress solidification of the resin material before the resin material reaches the location corresponding to the weld W generated at the wall portion 41, and it is thus possible to further suppress a reduction in mechanical strength in the vicinity of the weld W generated at the wall portion 41.

Effects of the First Embodiment

In the upper insulator 24 (the lower insulator 25) according to the first embodiment, the gate marks P are formed on the abutting surface 41c of the wall portion 41. Consequently, the resin material injected from each of the gate of the metal mold at the time of injection molding of the upper insulator, promptly and smoothly flows toward inside the metal mold for molding the wall portion 41 from each of the gates (the positions of the gate marks P). Consequently, the resin materials injected from the respective gates that are adjacent in the circumferential direction, bump into each other in a high temperature state; therefore, the resin materials are mixed together, and thus, it is possible to prevent the weld W from being easily generated. Furthermore, even if the weld W is generated, it is possible reduce an affected area to only a small portion on the wall portion 41. As a result, it is possible to suppress a reduction in mechanical strength of the wall portion 41.

Here, a case in which the stator core 23 is formed by joining the stator 22 of the three-phase motor 6 by caulking metal plates in a laminated direction of the plurality of metal plates (the axial direction of the shaft 3 of the three-phase motor 6), is conceived. In this case, for a reason described later, there may be a case, in which the thickness of the stator core 23 in the laminated direction (axial direction of the upper insulator 24) is not uniform over the circumferential direction position of the stator core 23 (position in the circumferential direction of the wall portion) (changed by the position in the circumferential direction of the stator core 23). The caulking joining portions 28 are joined by deforming a part of the metal plates, which are adjacent in the laminated direction, in the laminated direction; however, if the laminated metal plates are joined by V-shaped projection in cross section, a gap tends to be generated at the location in which the projections overlaps with each other, and thus, the thickness in the vicinity of the caulking joining portions 28 tends to be increased. Therefore, in this case, the thickness of the stator core 23 of the stator core 23 in the circumferential direction, tends to be increased in the vicinity of the caulking joining portions 28, and tends to be decreased in the vicinity of the stator core tooth portions 32 in which the winding wires 46 are wound and tightened. If the upper insulator 24 (the lower insulator 25), in which the abutting surface 41c of the wall portion 41 is formed as a flat surface, is fixed to the stator core 23 having deformation, a gap is generated between the stator core 23 and the upper insulator 24 (the lower insulator 25), so that stress is applied to the wall portion 41 and thus, damage, such as a crack of the wall portion 41, is easily generated. With this motor, it is desirable to dispose the gates (the positions of the gate marks P) such that the welds W are not generated, on the wall portion 41, at a position to which the above described stress tends to be applied on the wall portion 41.

From this point of view, the first embodiment is appropriate in a case where the stator core 23 in which the thickness of the axial direction is not increased in the vicinity of the opening portion 47 because the position in which the resin materials, injected from the adjacent respective gates in the circumferential direction, bump into each other corresponds to the position of the outer side of the opening portion 47 in the radial direction of the upper insulator 24. Specifically, the upper insulator 24 (the lower insulator 25) according to the first embodiment, is suitable in a case of using the stator core 23 with the thickness that is likely to be increased in the vicinity of the stator core tooth portions 32, i.e., in a case of using the stator core 23 in which the caulking joining portions 28 are arranged at the position of the yoke portion 31 corresponding to the outer side in the radial direction of the stator core tooth portions 32.

Furthermore, the gate marks P on the upper insulator 24 (the lower insulator 25) according to the first embodiment, are disposed on the center line L1 of the insulator tooth portions 42 in the circumferential direction of the wall portion 41. Accordingly, it is possible to equally ensure the flows of the resin materials, with respect to the circumferential direction of the wall portion 41, flowing toward the circumferential direction of the wall portion 41 at the time of injection molding; therefore, it is possible to appropriately form the shape of each portion of the upper insulator 24.

Furthermore, on the abutting surface 41c of the wall portion 41 of the upper insulator 24 (the lower insulator 25) according to the first embodiment, gate marks P, the number of which is a divisor of the number of the plurality of insulator tooth portions 42, are provided at regular intervals in the circumferential direction of the wall portion 41. Consequently, this makes it possible to equally ensure the flows of the resin materials, with respect to the circumferential direction of the wall portion 41, flowing toward the insulator tooth portions 42, the wall portion 41, and the like at the time of injection molding; therefore, it is possible to appropriately form the shape of each portion of the upper insulator 24.

In the following, another embodiment will be described with reference to drawings. In the other embodiment, components having the same configuration as those described in the first embodiment, are assigned the same reference numerals as those assigned in the first embodiment, and descriptions thereof will be omitted. In the other embodiment, disposition of the gate marks P on the abutting surface 41c of the wall portion 41 is different from that described in the first embodiment.

Second Embodiment

Figure 8A:
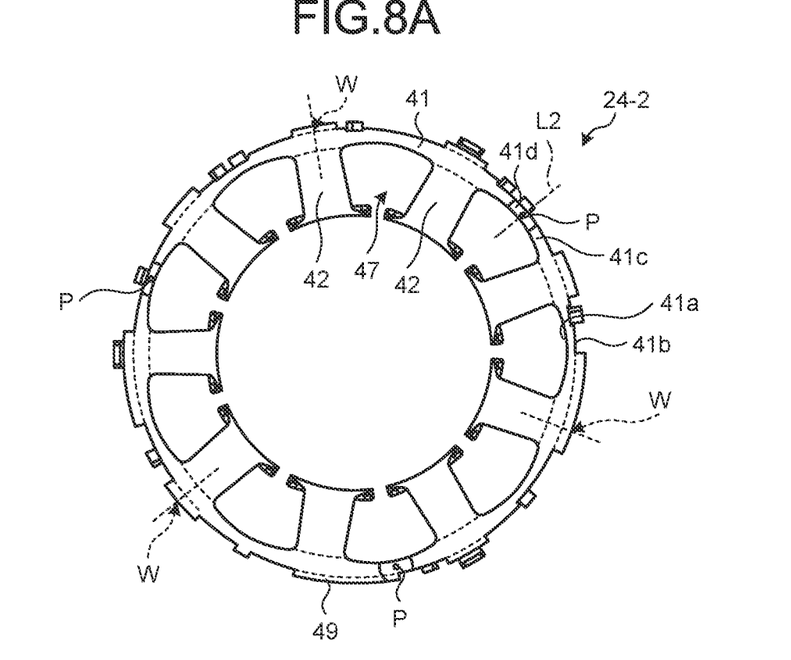
FIG. 8A is a plan view illustrating a main part of an upper insulator according to a second embodiment.
Figure 8B:
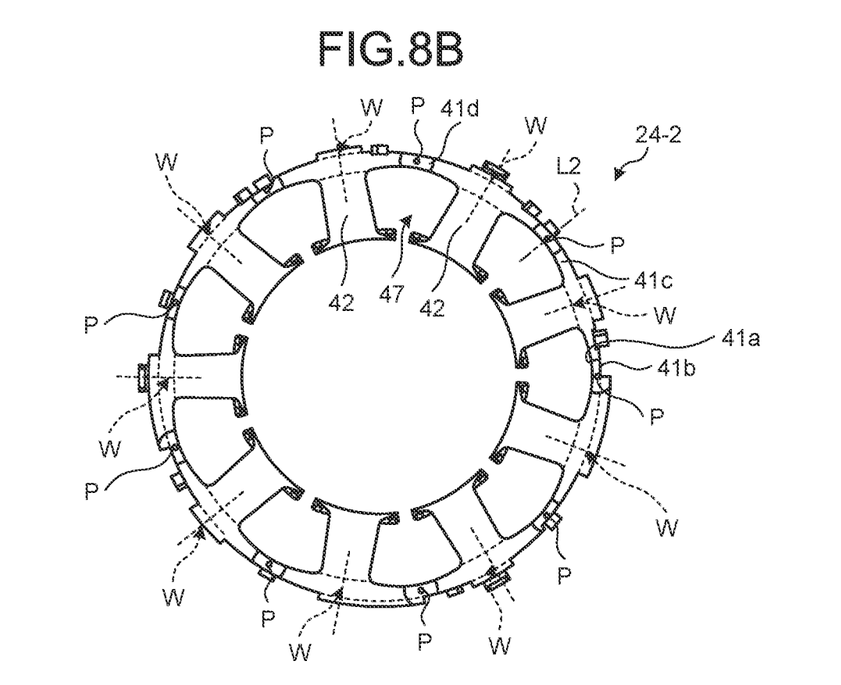
FIG. 8B is a plan view illustrating a modification of the main part of the upper insulator according to the second embodiment.

FIG. 8A is a plan view illustrating the main part of the upper insulator according to a second embodiment. FIG. 8B is a plan view illustrating a modification of the main part of the upper insulator according to the second embodiment. FIG. 8A and FIG. 8B are plan views each illustrating the upper insulator 24 viewed from a side that is in contact with the stator 22.

As illustrated in FIG. 8A, the plurality of gate marks P on an upper insulator 24-2 according to the second embodiment, are formed at the position associated with the opening portions 47 in the circumferential direction of the wall portion 41 (the positions corresponding to the outer side of the opening portions 47 in the radial direction of the upper insulator 24). On the abutting surface 41c of the wall portion 41, the gate marks P, the number of which (i.e., three gate marks) is a divisor of the number of the plurality of insulator tooth portions 42 (i.e., nine insulator tooth portions), are provided, and the plurality of gate marks P are disposed at regular intervals in the circumferential direction of the wall portion 41. The welds W according to the second embodiment, are formed at the center of the insulator tooth portions 42 in the circumferential direction of the wall portion 41. Furthermore, each of the gate marks P is disposed on the center line L2 of the respective opening portion 47 in the circumferential direction of the wall portion 41. Accordingly, the flows of the resin materials flowing toward the circumferential direction of the wall portion 41 at the time of injection molding, is equally ensured with respect to the directions that are separated from each other in the circumferential direction of the wall portion 41, so that the shape of each portion of the upper insulator 24 is appropriately formed.

Furthermore, as illustrated in FIG. 8B, in the upper insulator 24-2 according to the second embodiment, the same number of the gate marks P as the number of the plurality of insulator tooth portions 42 (9 pieces), may be disposed at regular intervals in the circumferential direction of the wall portion 41. In other words, in order to be associated with the number of slots of the three-phase motor 6, each of the gate marks P is formed at the position corresponding to the outer side of all of the opening portions 47 in the radial direction of the upper insulator 24. With the upper insulator 24 having the configuration in this way, it is possible to reduce the time before the resin materials, injected from the respective gates at the time of injection molding, bump into each other; therefore, it is possible to further suppress a reduction in mechanical strength of the wall portion 41.

With the upper insulator 24-2 according to the second embodiment, the resin materials at the time of injection molding flow from the respective gates (the positions of the gate marks P) toward the circumferential direction of the wall portion 41, and then, the flows of the resin materials from the adjacent gates in the vicinity of the insulator tooth portions 42, meet with each other; therefore, the welds W are generated at the insulator tooth portions 42 and at the position corresponding to the outer side in the radial direction of the insulator tooth portion 42 of the wall portion 41.

Effects of the Second Embodiment

In also the upper insulator 24-2 according to the second embodiment illustrated in FIG. 8A and FIG. 8B, similarly to the first embodiment, as compared to the comparative example illustrated in FIG. 10, it is possible to form the wall portion 41 and the welds W, by the high-temperature resin materials that are immediately after being injected from each of the gates (the positions of the gate marks P). Namely, because the resin materials promptly and smoothly flow from the respective gates (the positions of the gate marks P) toward the respective welds W, it is possible to suppress solidification of the resin materials before the resin materials reach the respective welds W generated at the wall portion 41. As a result, it is possible to suppress a reduction in mechanical strength of the wall portion 41.

Furthermore, as described above, by attaching the upper insulator 24-2 to the stator core 23 having deformation, stress is applied to the wall portion 41, and thus, damage, such as a crack of the wall portion 41, is easily generated. Accordingly, it is desirable to dispose the gates (the positions of the gate marks P) to prevent the welds W generated at the wall portion 41 from being generated at the positions to which the above described stress tends to be applied on the wall portion 41. From this point of view, the welds W generated at the wall portion 41 according to the second embodiment, are generated at the positions corresponding to the outer side in the radial direction of the insulator tooth portions 42, so that the second embodiment is suitable in a case of using the stator core 23, in which the thickness in the vicinity of the insulator tooth portions 42 is not increased.

Specifically, the upper insulator 24-2 according to the second embodiment, is suitable in a case of using the stator core 23, in which the portion between the stator core tooth portions 32 of the yoke portion 31 tends to be increased, i.e., in a case of using the stator core 23 in which the caulking joining portions 28 are arranged at the yoke portions 31 between the stator core tooth portions 32. If the stator core 23 having the configuration described above is used, the stress tends to be applied to a gap between the insulator tooth portions 42 of the wall portion 41 or a coupling portion between the inner peripheral surface 41a of the wall portion 41 and the insulator tooth portions 42 due to deformation of the stator core 23; therefore, disposition of the gate marks P according to the second embodiment is desirable in order to prevent the welds W from being generated in these positions.

Third Embodiment

Figure 9:
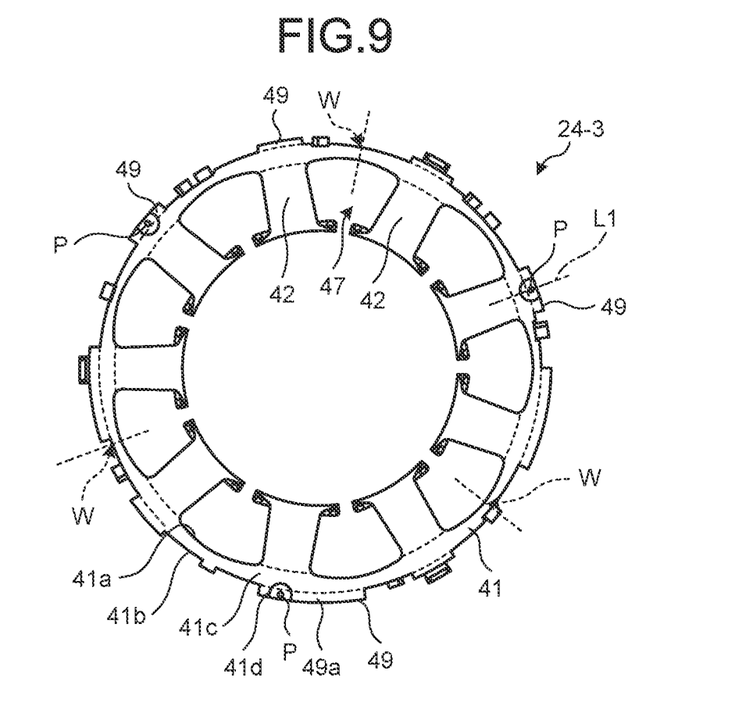
FIG. 9 is a plan view illustrating a main part of an upper insulator according to a third embodiment.

FIG. 9 is a plan view illustrating the main part of the upper insulator according to the third embodiment and is a plan view illustrating the upper insulator viewed from a side that is in contact with the stator 22.

As illustrated in FIG. 9, the plurality of gate marks P on an upper insulator 24-3 according to the third embodiment, are formed on the end surface 49a of the supporting protrusion 49. The supporting protrusion 49, on which the respective gate marks P are formed, are provided at the positions corresponding to the outer side in the radial direction of the insulator tooth portions 42 of the outer peripheral surface 41b of the wall portion 41. In the third embodiment, the gate marks P, the number of which (i.e., three gate marks) is a divisor of the number of the plurality of insulator tooth portions 42 (i.e., nine insulator tooth portions), are provided on the end surface 49a of the respective supporting protrusion 49, and the plurality of gate marks P are disposed at regular intervals in the circumferential direction of the wall portion 41. The welds W according to the third embodiment are formed in the vicinity of the center of the respective opening portions 47 in the circumferential direction of the wall portion 41. Furthermore, each of the gate marks P is disposed on the center line L1 of the insulator tooth portions 42 in the circumferential direction of the wall portion 41.

Furthermore, although not illustrated, similarly to the second embodiment, the gate marks P may be formed, in the circumferential direction of the wall portion 41, on the end surface 49a of the supporting protrusion 49 that is provided at the positions corresponding to the outer side of the opening portions 47 in the radial direction of the upper insulator 24. Furthermore, in also the third embodiment, similarly to FIG. 7, the gate marks P may be disposed at the positions corresponding to the outer side in the radial direction of the respective insulator tooth portions 42. This makes it possible to further shorten the period of time for which a gap between each of the gate marks P and the welds W is connected by the resin material, and it is thus possible to further suppress a reduction in mechanical strength of each of the welds W.

Effective of the Third Embodiment

The upper insulator 24-3 according to the third embodiment is different from the upper insulator 24 according to the first embodiment in that the resin firstly flows at the positions associated with the supporting protrusion 49. However, as illustrated in FIG. 3, the supporting protrusion 49 only slightly protrudes to the outer peripheral side of the wall portion 41, and the resin materials, which are injected from the gate, immediately flow to the wall portion 41. Accordingly, with also the upper insulator 24-3 according to the third embodiment, similarly to the first embodiment, as compared to the comparative example illustrated in FIG. 10, it is possible to form the wall portion 41 by the resin materials having high temperature and high fluidity immediately being injected from the respective gates (the positions of the gate marks P). Namely, the resin materials promptly and smoothly flow from the respective gates (the positions of the gate marks P) toward inside the metal mold for molding the wall portion 41, so that it is possible to suppress solidification of the resin materials before the resin materials, which are injected from the respective gates at the time of injection molding, bump into each other. As a result, it is possible to suppress a reduction in mechanical strength of the wall portion 41.

Furthermore, as illustrated above, if the upper insulator 24-3 is attached to the stator core 23 having deformation in the circumferential direction, it is desirable to dispose the gates (the positions of the gate marks P) such that the resin materials, which are injected from the respective gates at the time of injection molding, do not bump into each other at the positions in which the stress tends to be applied to the wall portion 41. From this point of view, similarly to the first embodiment, the welds W generated at the wall portion 41 according to the third embodiment are generated at the positions corresponding to the outer side of the opening portions 47 in the radial direction of the upper insulator 24; therefore, the third embodiment is suitable in a case of using the stator core 23, in which the thickness in the vicinity of the opening portions 47 is not increased.

REFERENCE SIGNS LIST 6 three-phase motor
21 rotor
22 stator
24 upper insulator
25 lower insulator
41 wall portion
41a inner peripheral surface
41b outer peripheral surface
41c abutting surface (one end surface)
41d recess portion
42 (42-1 to 42-9) insulator tooth portion (winding drum portion)
45 winding portion
46 winding wire
47 (47-1 to 47-9) opening portion
49 supporting protrusion
49a end surface
P gate mark
L1 center line of insulator tooth portion (center line of winding drum portion)
L2 center line of opening portion

The invention claimed is:

1. An insulator that is formed of a resin material using injection molding, and that is provided at an end portion in an axial direction of a stator that is included in a motor and that is formed in a cylindrical shape, the insulator comprising:
  a wall portion that is formed in a cylindrical shape;
  a plurality of winding drum portions that consecutively extend from the wall portion so as to be along one end surface in an axial direction of the wall portion from an inner peripheral surface of the wall portion toward an inner side in a radial direction of the wall portion; and
  a plurality of opening portions that are formed between respective winding drum portions, which are adjacent in a circumferential direction of the wall portion, wherein a gate mark, which indicates an injection location of the resin material, is formed on the one end surface of the wall portion in the axial direction of the wall portion.

2. The insulator according to claim 1, wherein the gate mark is disposed on a center line of each of the winding drum portions in the circumferential direction.

3. The insulator according to claim 1, wherein the gate mark is disposed on a center line of each of the opening portions in the circumferential direction.

4. The insulator according to claim 1, wherein
the wall portion includes a supporting protrusion that supports a winding wire pulled out from a winding portion in which the winding wire is wound around each of the winding drum portions,
the supporting protrusion has an end surface that protrudes from an outer peripheral surface of the wall portion toward an outer side in the radial direction and that extends along the one end surface of the wall portion,
the one end surface of the wall portion includes the end surface of the supporting protrusion, and
the gate mark is formed on the end surface of the supporting protrusion.

5. The insulator according to claim 1, wherein, on the one end surface of the wall portion, the gate marks, a number of which is a divisor of a number of the plurality of winding drum portions, are disposed at regular intervals in the circumferential direction of the wall portion.

6. The insulator according to claim 1, wherein a same number of the gate marks as a number of the plurality of winding drum portions is disposed on the one end surface of the wall portion at regular intervals in the circumferential direction of the wall portion.

7. A motor including an insulator according to claim 1, the motor comprising:
a rotor; and
the stator that is disposed on an outer peripheral side of the rotor, wherein
the insulator is provided at an end portion in the axial direction of the stator.

\* \* \* \* \*